(12) United States Patent
Krupka et al.

(10) Patent No.: US 7,043,843 B2
(45) Date of Patent: May 16, 2006

(54) DEVICE FOR CUTTING PASTRY

(76) Inventors: Loretta Krupka, Auf den Steinern 1, D-59519 Möhnesee (DE); Jürgen Gengnagel-Krupka, Auf den Steinern 1, D-59519 Möhnesee (DE)

( * ) Notice: Subject to any disclaimer, the term of this patent is extended or adjusted under 35 U.S.C. 154(b) by 0 days.

(21) Appl. No.: 10/492,623

(22) PCT Filed: Oct. 2, 2002

(86) PCT No.: PCT/DE02/03735

§ 371 (c)(1),
(2), (4) Date: May 5, 2004

(87) PCT Pub. No.: WO03/032737

PCT Pub. Date: Apr. 24, 2003

(65) Prior Publication Data

US 2005/0005782 A1    Jan. 13, 2005

(30) Foreign Application Priority Data

Oct. 10, 2001   (DE)   ................ 201 16 648 U

(51) Int. Cl.
*A21C 15/04*    (2006.01)
*B26B 13/00*    (2006.01)
(52) U.S. Cl. ................ 30/146; 30/142; 30/114
(58) Field of Classification Search .......... 30/123, 30/114, 142, 146, 131, 253, 299; D7/673, D7/674, 688, 693
See application file for complete search history.

(56) References Cited

U.S. PATENT DOCUMENTS

| | | | | |
|---|---|---|---|---|
| 2,800,714 | A | * 7/1957 | Evans | 30/114 |
| 4,423,551 | A | * 1/1984 | Chmela et al. | 30/142 |
| 5,469,622 | A | * 11/1995 | Gradoni | 30/146 |
| 6,591,503 | B1 * | 7/2003 | Voves | 30/142 |

FOREIGN PATENT DOCUMENTS

| | | |
|---|---|---|
| CH | 257 679 A * | 10/1948 |
| DE | 196 50 322 A1 * | 6/1998 |
| FR | 2 532 537 A * | 3/1984 |

* cited by examiner

*Primary Examiner*—Hwei-Siu Payer
(74) *Attorney, Agent, or Firm*—Herbert Dubno

(57) ABSTRACT

The invention relates to a device for cutting pastry, with limbs (3, 4), connected to each other by means of a hinge point and a large opening angle between the limbs (3, 4). According to the invention the pastry should also be cut with little application of force, whereby each limb (3, 4) has a cutting region (5) with an upper blade (6) on the upper limb (3) and a counter blade (7) on a lower limb (4) and a handle (17) for guiding and operating the device (1, 1a). The limbs (3, 4) are angled between the cutting region (5) and the handle (17), whereby the hinge point (2) is arranged on the end (20) of the handle (17) facing away from the cutting region (5).

9 Claims, 2 Drawing Sheets

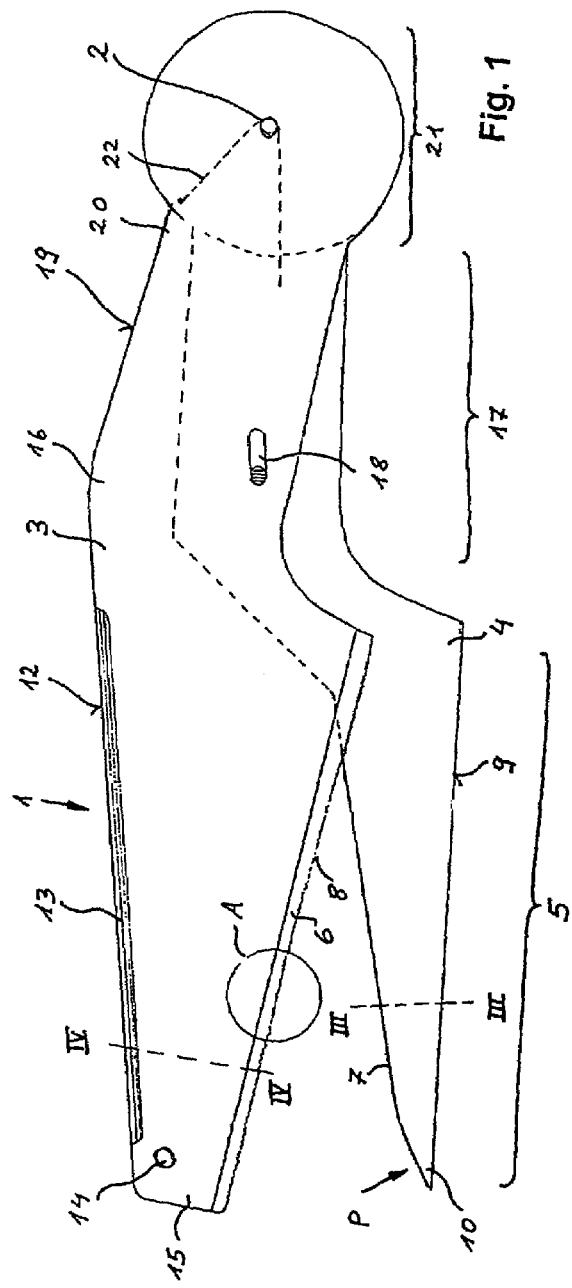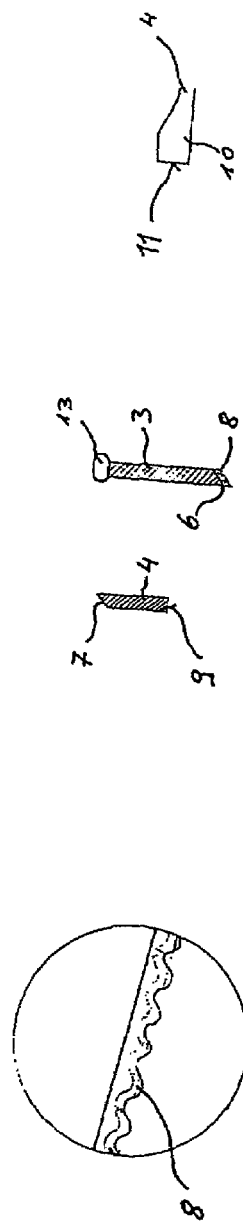

DEVICE FOR CUTTING PASTRY

CROSS REFERENCE TO RELATED APPLICATION

Figure 6:
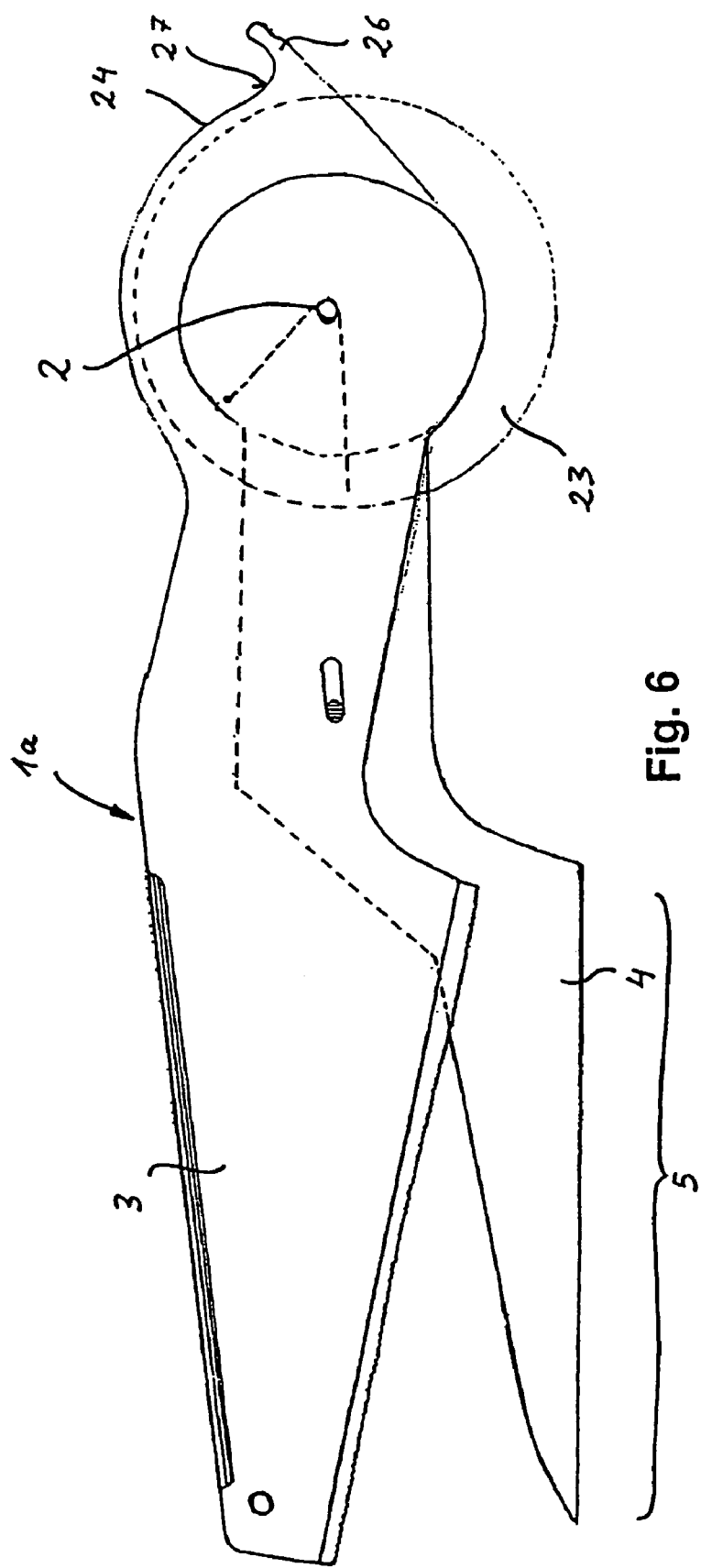

This application is a national stage of PCT/DE02/03735 filed 2 Oct. 2002 and based upon German national application 201 16 648.8 of 10 Oct. 2001 under the International Convention.

FIELD OF THE INVENTION

The invention relates to an implement for cutting flat baked ware.

BACKGROUND OF THE INVENTION

Pizzas, sheet baked ware and other flat baked items normally are cut into smaller serving size pieces. The cutting is usually done using a knife not always with satisfactory results. In particular it is seldom possible to cut crusty dough with a soft topping without the topping sliding on the dough. If the crust of the dough is crispy as in pizzas a sawing operation is required which usually makes the topping shift. These problems also happen when cutting through crispy toppings such as a salami topping since the movement back and forth of the knife on the one hand and its pressure on the other can press the topping into the pizza and leave unappetizing cut edges.

An alternative was presented in the form of the so-called rolling cutter, which has a sharp edged round disk for rolling over the baked goods. However, here too, the topping can slide ahead of the cutting roller. As with the knife it does not produce a clean cut result. It can also ruin the baking sheet.

The DE 196 50 322 C2 proposes an implement for cutting pastry which is shaped like a pair of scissors with two arms fixed round a pivot with grips at either ends, a cutting edge underneath as well as at the top of the cutter and with a obtuse-angled arm offset between the grips and the cutter. It is the position of the pivot in the upper part of the arm-offset almost above the cutter which distinguishes this instrument. Normally cutting with a pair of scissors needs considerably more strength especially when cutting through crusty pastry. The fact that the position of the pivot is considerably above and well away from the cutters gives poor leverage. The further away the pivot is from the cutting area, the more strength has to be used for cutting. If on the other hand the center of rotation was nearer to the cutter that would reduce the opening angle.

OBJECT OF THE INVENTION

The object of this invention is to provide an implement for cutting baked goods with arms connected to each other by a pivot while maintaining a wide opening angle for the arms and not requiring excessive strength when cutting baked goods.

SUMMARY OF THE INVENTION

The cutter of the invention has connected arms which provide a cutting region with an upper cutting edge on the upper arm and a counter cutting edge on the arm underneath. The instrument can be manipulated by using a grip positioned between the pivot and the cutting area. To avoid contact with the pastry the arms are cranked or offset in the crossing area between the cutting area and the grip. Therefore the grip is elevated well above the pastry.

The position of the pivot is an important point of the invention. The fact, that the pivot is considerably well away from the cutting area results in sufficient distances between the upper cutter and the underneath cutter with a small angle of spread to allow cutting thick baked goods.

It is advantageous to provide the upper arm in the cutting area with a grip-plate on its upper edge. This particularly advantageous configuration results in an optimal force transfer to the upper cutter. The difference from the normal form of scissors is that the cutting force can be transferred immediately to the upper cutter. Here one's own body weight is used by propping it on the grip plate. This enables even small persons to cut crusty dough without needing too much strength, without a "saw operation" and without fear that the topping of the baked goods will be ruined. The grip plate can be provided at the upper edge of the upper cutter in one piece or can be installed thereon as a separate component.

Here it is important to have a grip plate of a certain minimum width to avoid pain in the hand when using it more often. For that purpose the grip plate in at least a region can be wider than the upper shank. An ergonomically upholstery for example with a rubber layer could be helpful. In this form the real cutting process is done through the pressure on the grip plate while the grip itself is only for leading the implement. The separation of functions and simultaneous angle of spread enables especially good manipulation of this large implement.

Another feature provides that the upper arm is shiftable against a spring force relative to the lower arm. A leaf or helical spring can be positioned close to the pivot to bias the implement into the position open. The user of the implement can continue cutting baked goods without reopening the cutter after each cut so that the implement after each cut can be further advanced in the baked goods and only requires the upper blade to be pressed down for the next cut.

For safety reasons, it is provided that the upper shank or arm be lockable with respect to the lower shank or arm in a locking position. On the one hand the device requires less space when it is unused and on the other hand the risk of injury is significantly reduced.

A wave grinding of at least one blade, preferably the upper blade makes it possible to effect a cutting without having the baked product pressed out of the device but rather be fixed therein.

The wave grinding of the cutting edge is thus preferably so configured that the upper blade embeds itself in the baked product with the baked product conforming to the blade so that the baked product cannot slip out of the cutter. The topping as a result of this feature is not pressed ahead of the cut but rather held exactly in place and is cut there to produce a clean cut edge. The counter blade is preferably made free from a wave grinding so that will easily pass beneath the baked product. Optionally, it is naturally also possible to provide a wave grinding on the counter blade.

The counter blade is laterally widened at its tip. The tip of the counter blade is the region which first must be passed beneath the baked product. So that the baking sheet, especially a coated baking sheet will not be damaged, it is provided that the tip be laterally widened, that is perpendicular to the upper blade and the counter blade. This widening has the effect of lifting the dough of the baked product without tearing it. The widening can be to such an extent and can extend in the region of the hand grip on the underside of the lower shank or arm that it functions as a significant lifter for the cut baked product. It is also conceivable that such a lifter can be lifted onto the implement as a separate component. The widening of the tip of the counter blade can be on one side thereof or on both sides thereof. It can be in one piece with the lower shank or arm or further a separate component which is fitted onto the tip.

With respect to the configuration of the upper and lower shanks or arms in the cutting region, the upper shank or arm in the cutting region can have a greater height than the lower shank or arm. The greater height of the upper shank has the advantage that the gripper plate will always lie above the baked product and thus a person using the implement need not come into direct contact with the baked product. To enable sufficient force to be supplied to the baked product it is provided that the lower shank at its underside be configured to be flat and to lie against the baking sheet. From its front tip, the lower shank or arm can rise gradually in the direction of the hand grip so that the baked product in the vicinity of the cutting edge will be released from the baking sheet or its support. This has the advantage that when a separate lifter is used, it can easily be inserted below the baked product to remove the cut piece. In the cutting, the lower shank or arm is guided basically parallel to the baking sheet and in practice the end of the lower shank or arm provided with the hand grip naturally can also be lifted. For this case, the tip of the lower shank is preferably slightly rounded so as to avoid damage to sensitive baking sheets or support even with this type of manipulation. The greater height upper shank can be provided between the gripper plate and the upper edge with decorative or weight reducing cutouts. An opening in the front or rear region of the upper shank can enable the implement to be hung on a hook or to be suspended similarly.

In a further feature of the invention, in the region of the pivot point a cutting wheel is disposed. Such a cutting wheel has its center of rotation preferably at the pivot point of the interconnected shanks or arms so that in this region only a single bearing is required. The cutting wheel can serve as an alternative cutting means for baked goods which, because of their consistency, can be subdivided more simply by a cutting wheel. Since the cutting wheel is located in the direct vicinity of the hand grip, it is at least partly protected by a shield. This partial shielding prevents injury in manipulation. In addition, via the shield the cutting wheel can receive sufficient force to facilitate the cutting operation. The shield may have corresponding projections or surface structures for this purpose.

The upper shank or arm and the lower shank can be widened in the region of the pivot point. This widening perpendicular to the axis of rotation of the arm or shank insures that a mutual guidance of the arms or shanks. The widening especially should be provided on the side of the pivot turned away from the cutting region so that the upper blade can be guided closely along the counter blade.

A further possibility for guiding the blades closely against one another is to have the arm or shanks form-fittingly engage in one another in the region of the handgrip. In this case, for example, a groove can be provided in one arm or shank and a projection on the other arm or shank can engage in this groove. With this feature, it is insured that the arm or shanks connected with one another always have a defined spacing with respect to one another and contributes satisfactory cutting results to the implement.

With the implement according to the invention a clean and force-saving cutting of baked goods is possible whereby the topping of the baked goods is cut substantially perpendicular to the dough. A wave grind of the upper blade limits the movement of the topping away from the cut. The implement can be made from stainless steel. It is materially also possible to use other materials and material combinations, like, for example, metals with Teflon coating or embodiments in appropriate plastic or ceramic.

BRIEF DESCRIPTION OF THE INVENTION

The invention is described in the following in greater detail in conjunction with the figures. They show:

FIG. 1 a side elevation of a first embodiment of the implement according to the invention;

FIG. 2 the detail A of FIG. 1;

FIG. 3 a section along the line III—III in FIG. 1;

FIG. 4 a section along the line IV—IV of FIG. 2;

FIG. 5 is the tip of the implement shown in FIG. 1 in a view in the direction of the arrow P; and FIG. 6 in the view of FIG. 1 a further embodiment of the implement with a cutting wheel.

SPECIFIC DESCRIPTION

FIG. 1 shows an implement 1 for the cutting of baked goods. It comprises two arms or shanks 3 or 4 connected together via a pivot point. In a cutting region 5, the upper shank or arm 3 is provided with an upper cutting blade 6 and the lower shank or arm 4 with a counter blade 7. The upper blade 6 has a wave grind 8 as can be seen from FIG. 2. The upper blade 6 cooperates with the counter blade 7 which is provided without a wave grind (FIG. 3). The upper blade 6 and lower blade 7 are ground with opposite inclinations as can be ascertained from FIGS. 3 to 4.

The upper blade 6 is apart from the wave grind 8, straight over its longitudinal extent so that it runs parallel to the lower edge of the arm or shank 4 in a closed position of the implement. The lower edge 9 and the upper edge 6 thus have the same lengths. While the upper blade is straight, the counter blade 7 rises from its tip 10 continuously in the direction of the pivot 2.

FIG. 5 shows the tip 10 of the lower shank or arm 4 in a view in the direction of the arrow P as being widened to one side. The tip 10 thus forms a widened forward edge 11 which is tapered back toward the reminder of the lower shank or arm 4. The widened region is provided only in the region of the lower edge 9 of the lower shank or arm and does not extend over its entire height. It serves only to protect the baking sheet or the like in the use of the implement and to lift the baked goods with the implement.

In the cutting region 5, the upper shank or arm 3 is provided at its upper edge 12 with a grip plate 13 which extends substantially over the entire length of the cutting region. The grip plate 13 is widened relative to the upper shank or arm 3 (FIG. 4) and can, for example, be composed of plastic. In the front region of the upper shank 3 an opening 14 is located to enable the implement 1 to be hung on a hook or the like. The height of the upper shank 3 increases in the cutting region 5 from the front end 15 to the rear end 16 of the cutting region continuously and is over the entire cutting region 5 higher than the height of the lower shank 4. At the rear end 16 of the cutting region 5, a hand grip 17 is connected which is formed between the rear end and the pivot 2 in the region of constant height of the upper shank or arm 3 but is not shown in greater detail. The lower shank 4 also has a region of constant height configured as a hand grip. In the transition region between the cutting regions and the hand grip, the lower shank 4 as well as the upper shank 3 are offset. In the region of the hand grip 17 there is provided a locking device 18 with which the two shanks 3, 4 can be locked together. In a manner now shown in greater detail, the upper edge 19 in the region of the hand grip 17 can be provided with a gripper plate for reliable gripping of the implement 1. In addition, the exterior of the entire hand grip 17 formed by the shanks 3, 4, can have ergonomically shaped gripper attachments.

At the end 20 of the hand grip 17 turned away from the cutting region 5, there is a bearing region 21 with a spring 22. The spring 22 is located between the upper shank 3 and the lower shank 4 and provides a spring force which tends to bias the implement 1 into its open position. The bearing region 21 has a circular disk configuration and serves to guide the upper shank 3 and the lower shank 4 against one another.

In the configuration of FIG. 6, the same reference characters are used as those in FIG. 1 for the same parts. The embodiments of FIG. 6 differs from that of FIG. 1 in that in the region of the pivot 2, a cutting wheel 23 is located and is rotatable on the pivot 2. The cutting wheel 23 is shielded in its upper region by a shield 24 so that a user is protected against injury. On the end turned away from the cutting region 5, the implement 1 has a nose 26 provided on the shielding 24 which defines a gripping trough 27. The gripping trough serves to receive the thumb in use of the implement 1a whereby pressure can be exerted on the tool.

The invention claimed is:

1. A device for cutting baked goods having upper and lower shanks or arms connected together by means of a pivot pin traversing the shanks or arms, each shank or arm having a cutting region with an upper blade on the upper shank or arm and a counter blade on the lower shank or arm and a hand grip for advancing and actuating the device, wherein the shanks or arms between the cutting region and the hand grip being stepped and the pivot pin being disposed at an end of the hand grip opposite the cutting region, the upper blade having a cutting edge substantially parallel to but offset from the respective shank or arm, each of said shanks or arms being widened in a region of said pivot pin to ensure close guidance of said upper blade along said counter blade.

2. The device according to claim 1 wherein the upper shank or arm is provided in the cutting region with a gripper plate on an upper edge thereof.

3. The device according to claim 1 wherein the upper shank or arm is braced against a spring force in the direction of the lower shank or arm.

4. The device according to claim 1 wherein the upper shank or arm can be locked relative to the lower shank or arm in a locking position.

5. The device according to claim 1 wherein at least one of said blades is provided with a wave grind alone the respective edge.

6. The device according to claim 1 wherein the counter blade is laterally widened at its tip.

7. The device according to claim 1 wherein the upper shank or arm has a greater height in the cutting region than the lower shank or arm.

8. The device according to claim 1 wherein in the region of the pivot pin a cutting wheel is arranged.

9. The device according to claim 8 wherein the cutting wheel is partly protected by a shield.

* * * * *